United States Patent [19]
Kohler

[11] Patent Number: 4,505,691
[45] Date of Patent: Mar. 19, 1985

[54] UNIVERSAL TIGHTENER FOR A TRANSMISSION CHAIN OR BELT

[75] Inventor: Bernard Kohler, La Celle St-Cloud, France

[73] Assignee: Sedis Compagnie des Transmissions Mecaniques, France

[21] Appl. No.: 553,870

[22] Filed: Nov. 21, 1983

Related U.S. Application Data

[63] Continuation of Ser. No. 224,065, Jan. 12, 1981, abandoned.

[30] Foreign Application Priority Data

Jan. 18, 1980 [FR] France .................. 80 01042

[51] Int. Cl.³ ............................................. F16H 7/08
[52] U.S. Cl. ................................ 474/101; 474/111; 74/531
[58] Field of Search ............... 474/101, 111, 133, 134, 474/135; 74/531

[56] References Cited

U.S. PATENT DOCUMENTS

| | | | |
|---|---|---|---|
| 2,513,436 | 7/1950 | Vandergriff | 474/133 |
| 2,663,195 | 12/1953 | Horan | 474/135 |
| 2,806,385 | 9/1957 | James | 74/531 |
| 2,871,713 | 2/1959 | House | 74/531 X |
| 3,426,606 | 2/1969 | Hopkins | 474/111 |
| 3,463,025 | 8/1969 | Turner et al. | 474/111 |

FOREIGN PATENT DOCUMENTS 1089725 11/1967 United Kingdom .
1190366 5/1970 United Kingdom .

Primary Examiner—James A. Leppink
Assistant Examiner—Frank H. McKenzie, Jr.
Attorney, Agent, or Firm—Remy J. VanOphem

[57] ABSTRACT

The tightener includes a contoured strip adapted to bear against the chain or belt and be pivotally mounted on a fixed support member. A wedge member slidably mounted on the support member is elastically biased by a spring and urges the contoured strip against the chain or belt. A guide rod extends through a bore in the wedge member and the spring is mounted on the guide rod. A plate slidably mounted on the guide rod between the spring and the wedge member along one of the edges of the plate and thereby create an eccentric force which jams the plate on the guide rod.

6 Claims, 2 Drawing Figures

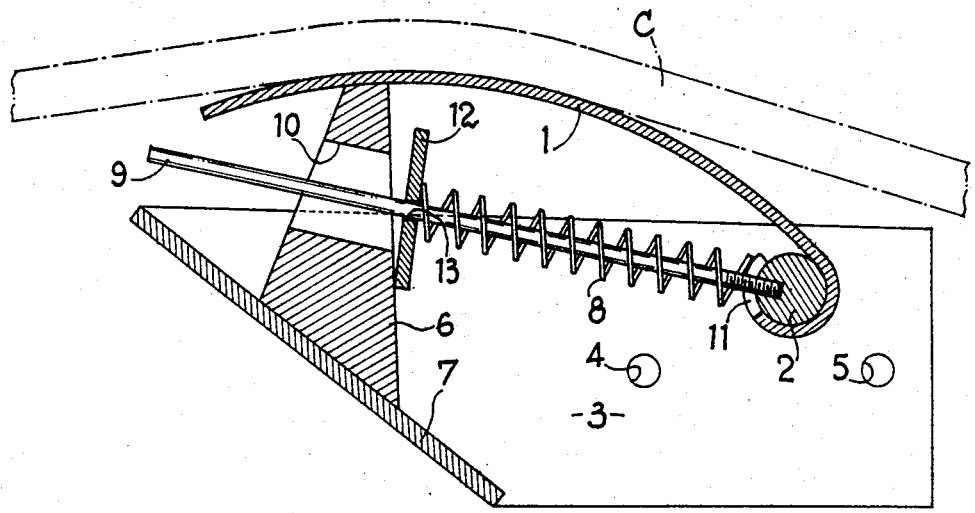
FIG_1
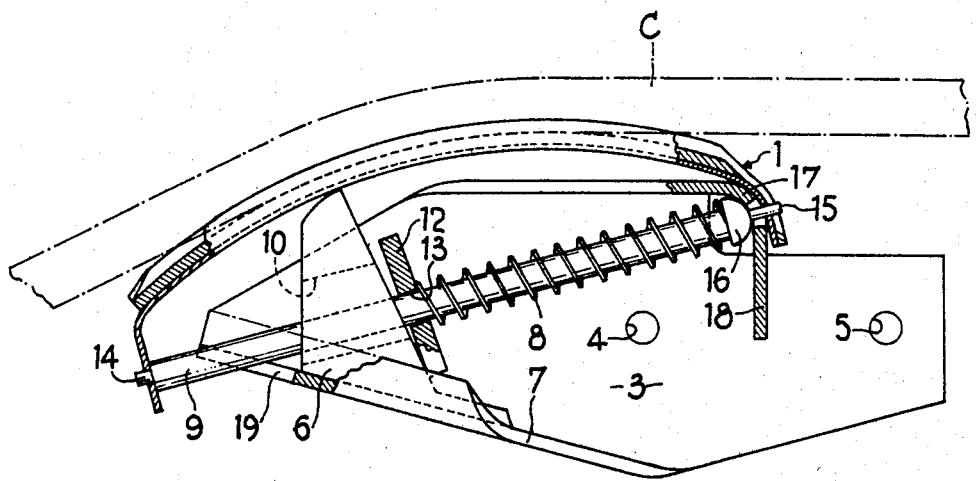
FIG_2

UNIVERSAL TIGHTENER FOR A TRANSMISSION CHAIN OR BELT

This is a continuation of application Ser. No. 224,065, filed Jan. 12, 1981, now abandoned.

BACKGROUND OF THE INVENTION

The present invention relates to universal mechanical tighteners or tensioners for chains or belts employed in the timing-gear train of internal combustion engines, and more particularly to mechanical tighteners which are capable of insuring an irreversible operation when the torque is reversed.

DESCRIPTION OF THE PRIOR ART

French Pat. No. 1 523 640 discloses such a mechanical tightener having an irreversible operation. The tightener includes a contoured strip adapted to bear against the chain or belt and carried by a first arm pivotally mounted on a second arm which is adapted to be mounted on a fixed part of the engine. A slidable wedge member mounted between the two arms is biased by a spring in a direction which tends to move the two arms apart, so that, as the second arm is fixed, the wedge member has for effect to urge the sliding strip against the chain or belt and tighten the latter. The spring is mounted on a rod which is mounted to pivot about the common pivot axis of the two arms and extends through a bore in the wedge member. In order to insure that the mechanism is irreversible, the slidable wedge member and the first arm carry inclined complementary teeth which, in operation, are engaged so as to allow the displacement of the wedge member in the direction which tends to move the two arms apart and to preclude its displacement in the other direction. However, a disadvantage of this tightener is that the regulation of the tension of the chain or belt is effected by discrete amounts corresponding to the pitch of the complementary teeth of the wedge member and arm. Further, these teeth complicate the construction of the container and increase its manufacturing cost.

U.S. Pat. No. 2,513,436 describes a belt tightener whose anti-return means is formed by a pivotal bar provided with an aperture through which there extends a rod pivotally mounted on a lever carrying at one of its ends a freely rotatable pulley for tightening the belt. However, this patent does not disclose the original features of the present invention in respect of which the force for tightening the chain or belt is provided by a thrust resulting from the displacement of a wedge member between a fixed surface and a movable surface, whereas the anti-return operation results from the jamming of a plate which is freely mounted on a rod between the wedge member and a spring.

British Pat. No. 1 089 725 discloses a mechanical tightener having an irreversible action in which the regulation of the tension of the chain or belt is effected in a continuous manner. This tightener includes a roller which is freely rotatable at the end of a pivotal lever and bears against the chain or belt. The tensioning of the chain or belt is effected by a first spring which exerts a tensile force between the lever and a fixed point. The lever carries a transverse arm which extends through an aperture of an element having a fixed bearing point. This element is biased by a second spring so as to insure, by reaction on the bearing point, the wedging of the arm in one direction, i.e. that of the rearward return, while allowing the sliding of the arm through the element in a direction corresponding to an increase in the tension of the chain or belt. Although it insures a continuous regulation of the tension of the chain or belt, this tightener has the disadvantage a large number of component parts, which does not facilitate its mass production. Also, its large overall size is a disadvantage.

SUMMARY OF THE INVENTION

An object of the present invention is to provide a universal mechanical tightener having an irreversible action and combining the advantages of the two tighteners of the prior art described hereinbefore, without the disadvantages thereof, i.e. a tightener which insures a continuous regulation of the tension and yet is compact and requires only a minimum number of component parts for its construction.

According to the invention, there is provided a universal mechanical tightener for a transmission chain or belt for the timing-gear of an internal combustion engines. The tightener includes a contoured strip adapted to bear against the chain or the belt and pivotally mounted on a fixed support member, a wedge member slidably mounted on the support member and elastically biased by a spring for applying the contoured strip against the chain or belt, a guide rod extending through a bore in the slidable wedge member, on which there is mounted a spring, an anti-return means for preventing any displacement of the slidable wedge member in opposition to the action of the spring, wherein the anti-return means includes a plate which is slidably mounted on the guide rod between the spring and the slidable wedge member and adapted to bear along one of the edges thereof against the wedge member and thereby exert an eccentric force which jams the plate on the guide rod.

BRIEF DESCRIPTION OF THE DRAWINGS

Further features and advantages of the invention will be apparent from the ensuing description with reference to the accompanying drawing which is given solely by way of example and in which:

FIG. 1 is a longitudinal sectional view of an embodiment of the tightener according to the invention; and FIG. 2 is a plan view, with parts cut away, of another embodiment of the tightener according to the invention.

DESCRIPTION OF THE PREFERRED EMBODIMENT

With reference to FIG. 1, the tightener or tensioner includes a contoured strip 1 which is movable about a pin 2 rigid with a support member 3. This support member is fixed to a side of an engine (not shown) by two bolts which extend through apertures 4 and 5 formed in the support member. The chain or belt C of the engine bears against the outer surface of the strip 1. The strip 1 is biased against the chain or belt C by a movable wedge member 6 which bears, on one hand, against the inner surface of the strip 1 and, on the other, against an inclined ramp 7 formed by a raised tab portion of the support member 3. Further, this wedge member 6 is biased by a spring 8 guided on a rod 9 which is rigid with the pin 2 and extends through the wedge member 6 due to the provision of a bore 10 in the latter, and the end portion of the strip 1 which is bent round the pin 2 and has an aperture 11 which allows the pivoting of the strip about the pin 2. The spring 8 exerts its action on the wedge member 6 through a plate 12 which has an aperture 13 through which the rod 9 extends, this aperture being slightly larger than the diameter of the rod. The plate 12 bears against an inclined lateral face of the wedge member 6 by one of the edges of the plate so that an acute jamming angle is established which tends to pivot or tip the plate and jam it on the rod 9. This jamming is positive and produces an irreversible anti-return effect if the clearance between the rod 9 and the aperture 13 of the plate 12 is such that the possible pivoting angle of the plate as a function of its thickness is less than the wedging or jamming angle, namely about 6°. It can be seen that the wedge member 6 is always biased to move toward the left as viewed in FIG. 1, due to the action of the spring 8, whereas its return toward the right, under action of the compression forces exerted on the strip 1 by the belt or chain C, is precluded due to the jamming of the plate 12 on the rod 9.

Upon assembly, the anti-return device is neutralized by sliding a fork member astride the rod 9 between the wedge member 6 and the plate 12 and compressing the spring 8 so that it is possible to arm the tightening device for easily placing it in position on the engine. Thereafter, during operation, the tension of the chain or belt C is maintained by the wedge member 6 which, under the effect of the spring 8, tends to move the movable strip 1 away from the fixed ramp 7 as the wedge member 6 moves toward the left, until it reaches the end-of-travel position in which it is in its extreme left position as viewed in FIG. 1.

Reference will now be made to the preferred embodiment shown in FIG. 2 in which the same reference numerals as in FIG. 1 have been employed for similar component parts. In this modification, the rod 9, instead of being fixed to the pin 2, is embedded at both ends in the strip 1, for example, by means of two spigots 14 and 15 machined on the rod. Further, the strip 1 is pivotally mounted on the support member 3 by means of a semicylindrical knee joint 16 freely mounted on the rod 9 which bears against a rounded portion 17, produced by bending a tab portion 18 of the support member 3 and against which it is biased by the spring 8. The inclined ramp 7 has at its rear end a notch 19 for the passage of the rod 9 when the device is brought to the armed position thereof.

With this embodiment, whose operation is identical to that of the embodiment illustrated in FIG. 1, it is possible to obtain a pivotal assembly which is substantially without play with a rotation under constant pressure which is adjustable by the force of the spring. The wedge member 6 may be guided on the support member, as in the foregoing embodiment, by means of a portion of the support member 3 which is bent in the shape of a U or by means of a slot formed in the inclined ramp and receiving a spigot (not shown) rigid with the wedge member 6. In this embodiment, the support member may be wholly constructed from bent sheet metal and is consequently relatively inexpensive.

With the tightener according to this invention, it is not the wedge member 6 which has in itself the anti-return action. Its angle may consequently be large and this permits a large travel of the strip 1 with a relatively low force exerted on the transmission chain or belt. Further, the jamming of the plate 12 on the rod 9 renders the movement irreversible and the adjustment is infinite, in contrast to the devices employing teeth or a rack, such as that disclosed in French Pat. No. 1 523 640 which acts by successive steps. The absence of teeth permits the use of component parts of much simpler form, since it is sufficient that the upper edge of the wedge member 6 merely bear against the inner surface of the strip 1. Note also that the tightener according to the invention is much simpler than that disclosed in the British Pat. No. 1 089 725, since it requires only a single spring which acts both for tensioning the chain or belt and for arming the anti-return device and moreover it requires no fixed bearing point for the jamming of the plate.

A clearance between the aperture 13 of the plate 12 and the guide rod 9 may be provided so as to delay the jamming action and thereby impart a certain elasticity to the anti-return device.

Having now described my invention what I claim is:

1. A universal mechanical tightener for a transmission chain or belt for a timing-gear of an internal combustion engine, said universal mechanical tightener comprising:

a support member comprising a mounting plate portion having a planar portion and raised tab portion, said planar portion being adapted to be mounted to said internal combustion engine in proximity to said transmission chain or belt, said support member further comprising a pivot portion extending from said planar portion of said mounting plate portion and an inclined ramp portion extending from said raised tab portion of said mounting plate portion, said inclined ramp portion being spaced from said pivot portion and having an inclined ramp surface inclined away from said pivot portion and facing towards said transmission chain or belt;

a contoured strip having a bearing side and a biasing side, said bearing side adapted to move towards and bear against said transmission chain or belt, said contoured strip further having a pivot end mounted at said pivot portion of said support member;

a wedge member having a ramp engaging surface for slidably engaging said inclined ramp surface of said support member and a strip engaging surface for engaging said biasing side of said contoured strip, said wedge member further having an anti-return surface facing said pivot portion of said support member and a rod clearance therethrough intermediate said strip engaging surface and said ramp engaging surface;

an anti-return plate having a wedge facing surface facing said anti-return surface of said wedge member, a pivot portion facing surface facing said pivot portion of said support member, and a rod aperture having an inner diameter communicating said pivot portion facing surface and said wedge facing surface;

a rod having a first rod end mounted at said pivot portion and a rod length, said rod length slidably supported by said inner diameter of said rod aperture of said anti-return plate and clearing said wedge member at said rod clearance thereof, said rod having an outer diameter providing a jammable clearance with said inner diameter of said rod aperture of said anti-return plate so as to enable said rod to effect an acute jamming angle with respect to said anti-return plate preventing said anti-return plate from moving towards said pivot portion; and wedge-biasing and anti-return-arming spring means confiningly guided by said rod compressed between said pivot portion of said support member and said pivot portion facing surface of said anti-return plate, said wedge-biasing and anti-returnarming spring means operative to urge said anti-return plate to slide said wedge member on said inclined ramp surface away from said pivot portion and towards said transmission chain or belt while simultaneously arming said anti-return plate by effecting said acute jamming angle with said rod;

whereby, as said wedge-biasing and anti-return-arming spring means urge said anti-return plate to slide said wedge member on said ramp surface away from said pivot portion towards said transmission chain or belt, said strip engaging surface of said wedge member urges said contoured strip towards said transmission chain or belt to pivot both said contoured strip and said rod at said pivot portion of said support member, said wedge-biasing and anti-return-arming spring means at the same time causing said anti-return plate to effect said acute jamming angle with respect to said rod to prevent said anti-return plate from moving towards said pivot portion of said support member.

2. The universal mechanical tightener of claim 1, wherein said pivot portion of said support member comprises a pin, said rod being rigid with said pin, and wherein said contoured strip is pivotally mounted on said pin.

3. The universal mechanical tightener of claim 1, wherein said contoured strip and said rod each have a second end spaced from said pivot portion of said support member, said second ends being coupled to each other and wherein said pivot portion further comprises a curved tab.

4. The universal mechanical tightener of claim 1 wherein said jammable clearance between said inner diameter of said aperture and said outer diameter of said rod is sufficient to delay the jamming action.

5. The universal mechanical tightener of claim 2 wherein said jammable clearance between said inner diameter of said aperture and said outer diameter of said rod is sufficient to delay the jamming action.

6. The universal mechanical tightener of claim 3 wherein said jammable clearance between said inner diameter of said aperture and said outer diameter of said rod is sufficient to delay the jamming action.

* * * * *

UNITED STATES PATENT AND TRADEMARK OFFICE
CERTIFICATE OF CORRECTION

PATENT NO. : 4,505,691
DATED : March 19, 1985
INVENTOR(S) : Bernard Kohler

It is certified that error appears in the above-identified patent and that said Letters Patent is hereby corrected as shown below:

Column 1, between lines 8 and 9, insert ---- FIELD OF THE INVENTION ----.

Column 2, line 5, after "disadvantage" insert ---- of including ----.

Column 2, line 21, delete "gines. The" and insert ---- gine. The ----.

Column 2, between lines 46 and 47, before "DESCRIPTION" insert ---- DETAILED ----.

Signed and Sealed this

Tenth Day of September 1985

[SEAL]

Attest:

DONALD J. QUIGG

*Attesting Officer*    *Acting Commissioner of Patents and Trademarks - Designate*